(12) United States Patent
Li et al.

(10) Patent No.: US 9,218,366 B1
(45) Date of Patent: Dec. 22, 2015

(54) QUERY IMAGE MODEL

(71) Applicant: Google Inc., Mountain View, CA (US)

(72) Inventors: Congcong Li, Cupertino, CA (US);
Kunlong Gu, Belmont, CA (US);
Charles J. Rosenberg, Cupertino, CA (US)

(73) Assignee: Google Inc., Mountain View, CA (US)

( * ) Notice: Subject to any disclaimer, the term of this patent is extended or adjusted under 35 U.S.C. 154(b) by 194 days.

(21) Appl. No.: 14/145,100

(22) Filed: Dec. 31, 2013

Related U.S. Application Data

(60) Provisional application No. 61/909,498, filed on Nov. 27, 2013.

(51) Int. Cl.
*G06F 17/30* (2006.01)

(52) U.S. Cl.
CPC .... *G06F 17/30247* (2013.01); *G06F 17/30256* (2013.01)

(58) Field of Classification Search
CPC .............. G06F 17/30247; G06F 17/30256
USPC ............................................ 707/723
See application file for complete search history.

(56) References Cited

U.S. PATENT DOCUMENTS

| | | | | |
|---|---|---|---|---|
| 7,751,592 B1 * | 7/2010 | Rosenberg | ............ | G06K 9/6293 382/112 |
| 8,209,330 B1 * | 6/2012 | Covell | .............. | G06F 17/30265 707/728 |
| 8,370,282 B1 * | 2/2013 | Leung | ................ | G06F 17/30247 706/20 |
| 8,429,173 B1 * | 4/2013 | Rosenberg | ........ | G06F 17/30247 707/748 |
| 8,478,052 B1 | 7/2013 | Yee | | |
| 8,738,553 B1 * | 5/2014 | Leung | ................ | G06F 17/30247 706/20 |
| 8,787,683 B1 * | 7/2014 | Yee | ....................... | G06K 9/4676 382/155 |
| 8,891,858 B1 * | 11/2014 | Preetham | ............. | G06K 9/6256 382/159 |
| 8,903,182 B1 * | 12/2014 | Duerig | ..................... | G06K 9/46 382/159 |
| 9,110,923 B2 * | 8/2015 | Yee | .................... | G06F 17/30247 |
| 2010/0183189 A1 * | 7/2010 | Oh | ..................... | G06F 17/30247 382/100 |
| 2013/0060786 A1 * | 3/2013 | Serrano | ............. | G06F 17/30277 707/749 |
| 2013/0169988 A1 * | 7/2013 | Kim | ...................... | G06F 3/1204 358/1.13 |
| 2014/0089326 A1 * | 3/2014 | Lin | ................... | G06F 17/30259 707/749 |
| 2015/0169631 A1 * | 6/2015 | Gu | ..................... | G06F 17/30244 707/723 |
| 2015/0169754 A1 * | 6/2015 | Gu | ..................... | G06F 17/30256 707/728 |

OTHER PUBLICATIONS

Article entitled "Google Image Swirl: A Large-Scale Content-Based Image Visualization System", by Jing et al., dated Apr. 20, 2012.*

(Continued)

*Primary Examiner* — Mahesh Dwivedi
(74) *Attorney, Agent, or Firm* — Fish & Richardson P.C.

(57) ABSTRACT

Methods, systems, and apparatus, including computer programs encoded on a computer storage medium, for generating a query image model. In one aspect, a method includes receiving a set of images determined to be responsive to a query and ranked according to a first order; determining a positive image signature from a first subset of images selected from images ranked highest in the first order, determining a negative image signature from a second subset of images selected from images ranked lowest in the first order, determining a query image signature for the query based on a difference of the positive image signature and the negative image signature; and applying the query image signature to each image in the set of images to rank the images according to a second order that is different from the first order.

19 Claims, 6 Drawing Sheets

(56) References Cited

OTHER PUBLICATIONS

Goswami, et al., "A Study on the Impact of Product Images on User Clicks for Online Shopping," WWW 2011, Hyderabad, India, ACM 978-1-4503-0637—Sep. 11, 2003, 2 pages.

Kamichetty et al., "An Empirical Framework to Evaluate Performance of Dissimilarity Metrics in Content-Based Image Retrieval Systems," [online] [Retrieved Dec. 19, 2013]; Retrieved from the Internet URL: http://www-scf.usc.edu/~pnataraj/CAIR02.pdf, 6 pages.

LaLonde et al., "Automatic visual quality assessment in optical fundus images," [online] [Retrieved on Dec. 19, 2013]; Retrieved from the Internet URL: http://www.crim.ca/Publications/2001/documents/plein_texte/VIS_LalMals_VI01.pdf, 6 pages.

* cited by examiner

QUERY IMAGE MODEL

CROSS-REFERENCE TO RELATED APPLICATIONS

This application claims the benefit of U.S. Application Ser. No. 61/909,498, filed on Nov. 27, 2013, the entire disclosure of which is incorporated herein by reference.

BACKGROUND

This specification relates to information retrieval and image classification.

The Internet provides access to a wide variety of resources, such as image files, audio files, video files, and web pages. A search system can identify resources in response to a text query that includes one or more search terms or phrases. The search system ranks the resources based on their relevance to the search query and provides search results that link to the identified resources. The search results are typically ordered for viewing according to the rank.

Images are among the resources the search system identifies. The search system can utilize an image relevance model to evaluate the relevance of queries to images. For example, the relevance of an image to a user query can be determined, in part, based on textual content depicted in the image or textual content associated with the image, e.g., textual content appearing on a web page in association with the image. The relevance of an image to a query can also be determined by analyzing the way in which users who submit user queries interact with images responsive to the user queries. For example, an image search system may respond to a user query with one or more images, which are then displayed on a user device. If the user clicks on or otherwise interacts with one or more images, then this user interaction can be considered an indication that those images were good (relevant) responses to the user query.

SUMMARY

In general, one innovative aspect of the subject matter described in this specification can be embodied in methods that include the actions of receiving queries, and for each query: receiving a set of images determined to be responsive to the query, each of the images in the set of images ranked according to a first order, determining whether a first subset of images selected from images ranked highest in the first order meets a quality threshold, for each query for which the first subset of the images meet the quality threshold: determining a positive image signature based on image feature values of the images in the first subset, determining a second subset of images selected from images ranked lowest in the first order, determining a negative image signature based on image feature values of each image in a second subset of images, determining a query image signature for the query based on a difference of the positive image signature and the negative image signature; and applying the query image signature to each image in the set of images to rank the images according to a second order that is different from the first order. Other implementations of this aspect include corresponding systems, apparatus, and computer programs, configured to perform the actions of the methods, encoded on computer storage devices.

Another innovative aspect of the subject matter described in this specification can be embodied in methods that include the actions of receiving a query, receiving a set of images determined to be responsive to the query, each of the images in the set of images ranked according to a first order; selecting a first subset of images selected from images ranked highest in the first order; removing outlier images from the first subset of images; determining a positive image signature based on image feature values of the images remaining in the first subset of images; determining a second subset of images selected from images ranked lowest in the first order; removing inlier images from the second subset of images, each inlier image being an image for which a correlation between the positive image signature and the feature values of the image meets an inlier threshold; determining a negative image signature based on image feature values of the images remaining in the second subset of images; determining a query image signature for the query based on a difference of the positive image signature and the negative image signature; and applying the query image signature to each image in the set of images to rank the images according to a second order that is different from the first order. Other implementations of this aspect include corresponding systems, apparatus, and computer programs, configured to perform the actions of the methods, encoded on computer storage devices.

Particular implementations of the subject matter described in this specification can be implemented so as to realize one or more of the following advantages. Systems implementing the subject matter described below are able to extract a reliable query image signature for a query, based on content-based features of the images, to improve the search utility for long-tail queries for which user feedback models have not been trained. The query image signature has a discriminative property that can help boost visually similar images and demote visually different images more reliably than other relevance determination techniques. The query image signature can be computed at run time so that it is up-to-date, thereby taking into account new images as the new images are added to an image corpus. Finally, because the query image signature can be computed at run time, it can be created for any query, including long tail queries for which there is little or no search and feedback history data available.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

An image analysis system can be used to generate a query image signature that is based on visual features of multiple images that have been identified as highly relevant to a query, and also on visual features of multiple images that have been identified as being of low relevance to the query. In operation, the image analysis subsystem receives a set of images determined to be responsive to a query. Each of the images in the set of images is ranked according to a first order. For example, a set of Q images may be received, and the images are ranked in an order from 1 to Q, where Q is the cardinality of the set. The image analysis system determines whether a query image signature can be built, and, if so, uses the query image signature to adjust the ranking of the images in the set of Q images.

In operation, the image analysis system determines whether a subset of images selected from images ranked highest in the first order meet a quality threshold. For example, the image analysis system may select the top N ranked images, where N is much less than Q, and determine, from the feature values representing features of the N images, whether the images meet a quality threshold. The determination includes removing images that are visual outliers from the set of N images. The quality threshold may, for example, be indicative of whether the images in the top N images, excluding the outliers, exhibit common visual features. If the quality threshold is not met, then no query image signature is generated and the ranking of the images will not be adjusted by a query image signature for the query.

If, however, the quality threshold is met, then a positive image signature is generated from images (excluding the outliers) in the set of N images. Another set of images is then selected from the images ranked lowest in the set of Q images. Inlier images that are similar to the positive image signature are removed from this set. The remaining images are then used to generate a negative image signature. The query image signature is then generated from the positive image signature and the negative image signature. The final query image signature is applied to each image in the set of Q images to rank the images according to a second order that is different from the first order.

These features, and additional features, are described in more detail in the sections that follow.

Example Operating Environment

Figure 1:
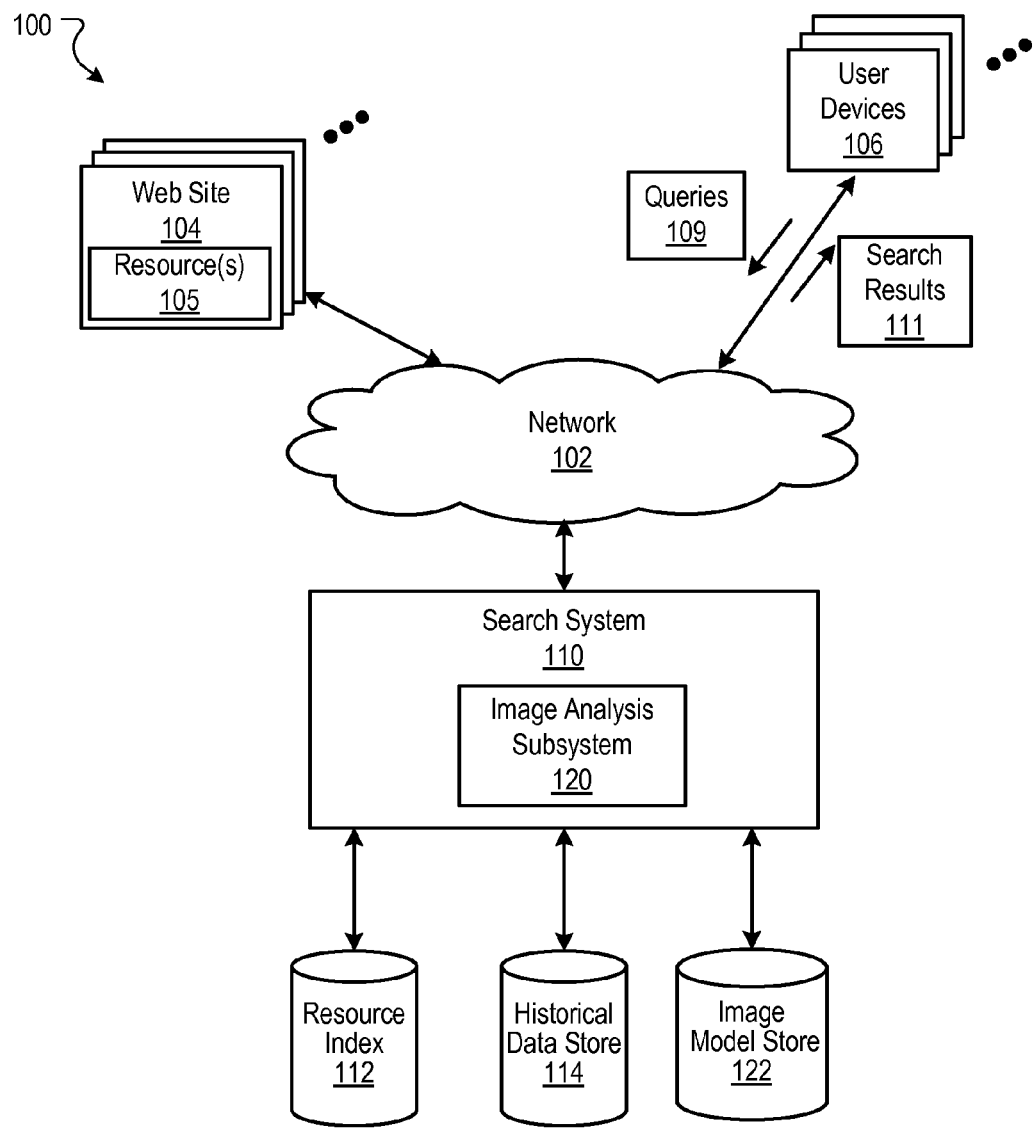
FIG. 1 is a block diagram of an example environment in which a search system provides search services.

FIG. 1 is a block diagram of an example environment 100 in which a search system 110 provides search services. A computer network 102, such as a local area network (LAN), wide area network (WAN), the Internet, a mobile phone network, or a combination thereof, connects web sites 104, user devices 106, and the search system 110. The environment 100 may include many thousands of web sites 104 and user devices 106.

A web site 104 is one or more resources 105 hosted by one or more servers and can be associated with a domain name. An example web site 104 is a collection of web pages formatted in hypertext markup language (HTML) that can contain text, images, multimedia content, and programming elements, such as scripts. Each web site 104 is maintained by a publisher, e.g., an entity that manages and/or owns the web site.

A resource 105 is data provided over the network 102 and that is associated with a resource address. Resources 105 provided by web sites 104 include HTML pages, images, video, and feed sources, to name just a few. The resources 105 can include content, such as words, phrases, images, and sound, and may include embedded information, e.g., meta information and hyperlinks, and/or embedded instructions, e.g., scripts.

A user device 106 is an electronic device that is capable of requesting and receiving resources 105 over the network 102. Example user devices 106 include personal computers, mobile communication devices, and other devices that can send and receive data over the network 102. A user device 106 typically includes a user application, such as a web browser, to facilitate the sending and receiving of data over the network 102.

To facilitate searching of resources 105, the search system 110 identifies the resources 105 by crawling and indexing the resources 105 provided on web sites 104. Data about the resources 105 can be indexed based on the resource 105 to which the data corresponds. The indexed and, optionally, cached copies of the resources 105 are stored in an index 112.

A user device, such as user device 106, can submit a search query 109 to the search system 110. The search system 110 performs a search operation that uses the search query 109 as input to identify resources 105 responsive to the search query 109. For example, the search system 110 may access the index 112 to identify resources 105 that are relevant to the search query 109. The search system 110 identifies the resources 105, generates search results 111 that identify the resources 105, and returns the search results 111 to the user devices 106.

The search query 109 can include one or more search terms. A search term can, for example, include a keyword submitted as part of a search query 109 to the search system 110 that is used to retrieve responsive search results 111. A search result 111 is data generated by the search system 110 that identifies a resource 105 that is responsive to a particular search query 109, and can include a link to the resource 105. An example search result 111 can include a web page title, a snippet of text or an image or portion thereof extracted from the web page, and a hypertext link, e.g., a uniform resource locator (URL) to the web page.

An image search result typically includes a representation of the image referenced by the search result, but may not be the actual referenced image. For example, an image search result may include a reduced-sized version of the referenced image, e.g., a thumbnail image, or a cropped version of the referenced image.

The search results 111 that are identified as relevant to a particular query, e.g., are responsive to the query, can be ranked, for example, based on one or more ranking algorithms used by the search system 110. For example, the search system 110 can retrieve search results 111 based, at least in part, on the search terms of the 109, and then rank the search results 111 based on one or more additional factors, as described in more detail below.

The user devices 106 receive the search results pages and render the pages for presentation to the users. In response to the user selecting a search result 111 at a user device 106, the user device 106 requests the resource identified by the resource locator included in the search result 111. The web site 104 hosting the resource 105 receives the request for the resource 105 from the user device 106 and provides the resource 105 to the requesting user device 106.

Data for the search queries 109 submitted during user sessions are stored in a data store, such as the historical data store 114. For example, the search system 110 can store received search queries in the historical data store 114. Selection data specifying actions taken in response to search results 111 provided in response to each search query 109 are also stored in the historical data store 114. These actions can include whether a search result 111 was selected, e.g., clicked or hovered over, and for each selection, for which search query 109 the search result 111 was provided. As used herein, an image that is referenced in an image search result is considered to be selected when a user interaction with the search result referencing the image has been determined to have occurred.

The data stored in the historical data store 114 can be used to map search queries 109 submitted during search sessions to resources 105 that were identified in search results 111 and the corresponding selection data. For example, the historical data can map how many times a search result for each image indexed in the index 112 has been selected when presented in response to a particular query.

Image Searching

The environment 100 also includes an image analysis subsystem 120 that classifies, ranks, and/or or scores images for search queries. Although illustrated and described throughout this document as a subsystem, the image analysis subsystem 120 may be implemented separately from the search system 110.

For search queries directed to images, the search system 110 can interact with the image analysis subsystem 120 to rank images. In general, the image analysis subsystem 120 ranks images for a query based on a relevance score for each image with respect to the query. The relevance score may be based on one or more of a topicality signal and a feedback signal. A topicality signal may be, for example, an information-retrieval based signal that is a measure of relevance of query terms to image labels for an image. An image label is text associated with each image, and can include the image file name, text from a web page in which the image is displayed, image metadata, and other textual data. A feedback signal is based on the number of selections (or the selection rate) of an image for a query. For example, an image with a very high selection rate for a particular query may be ranked higher for the query than an image with a very low selection rate for the same query.

In some implementations, the image analysis subsystem 120 can determine a relevance score for an image and a query using one or more predictive models for the query. The predictive model(s) for a particular query can be trained using content feature values of training images for which a relevance value is available. For example, the predictive model can be trained for a particular query with a set of training images, also referred to as training samples, that have been previously labeled as relevant to the query or not relevant to the query. The trained predictive model(s) are stored in an image model store 122 and can then be applied to content feature values of other images, e.g., unlabeled images, to determine a relevance score for the other images relative to the query.

In general, a content feature is a visual characteristic of a portion of an image, such as color, histograms of image color or grayscale data, texture, edges, corners, geometric information, image centers of gravity, and other characteristics of a portion of the image. A content feature value is a value indicative of a corresponding visual characteristic of a portion of an image. For example, a content feature value of a color content feature may be a value indicative of the color blue at a particular location or three values indicative of the average color for a region.

The predictive models work well for many queries. However, for some queries for which there are little historical data available, such as very infrequent queries or "long tail" queries, the image analysis subsystem 120 may not be able to generate a reliable predictive model. In these situations, the image analysis subsystem 120 can first identify images whose relevance is determined according to a first signal, such as a topicality signal, and then generate a query image signature for the query from these images. The query image signature may then be used to either adjust the ranking of the images that were initially identified, or to conduct a subsequent search of images for the query.

Figure 2:
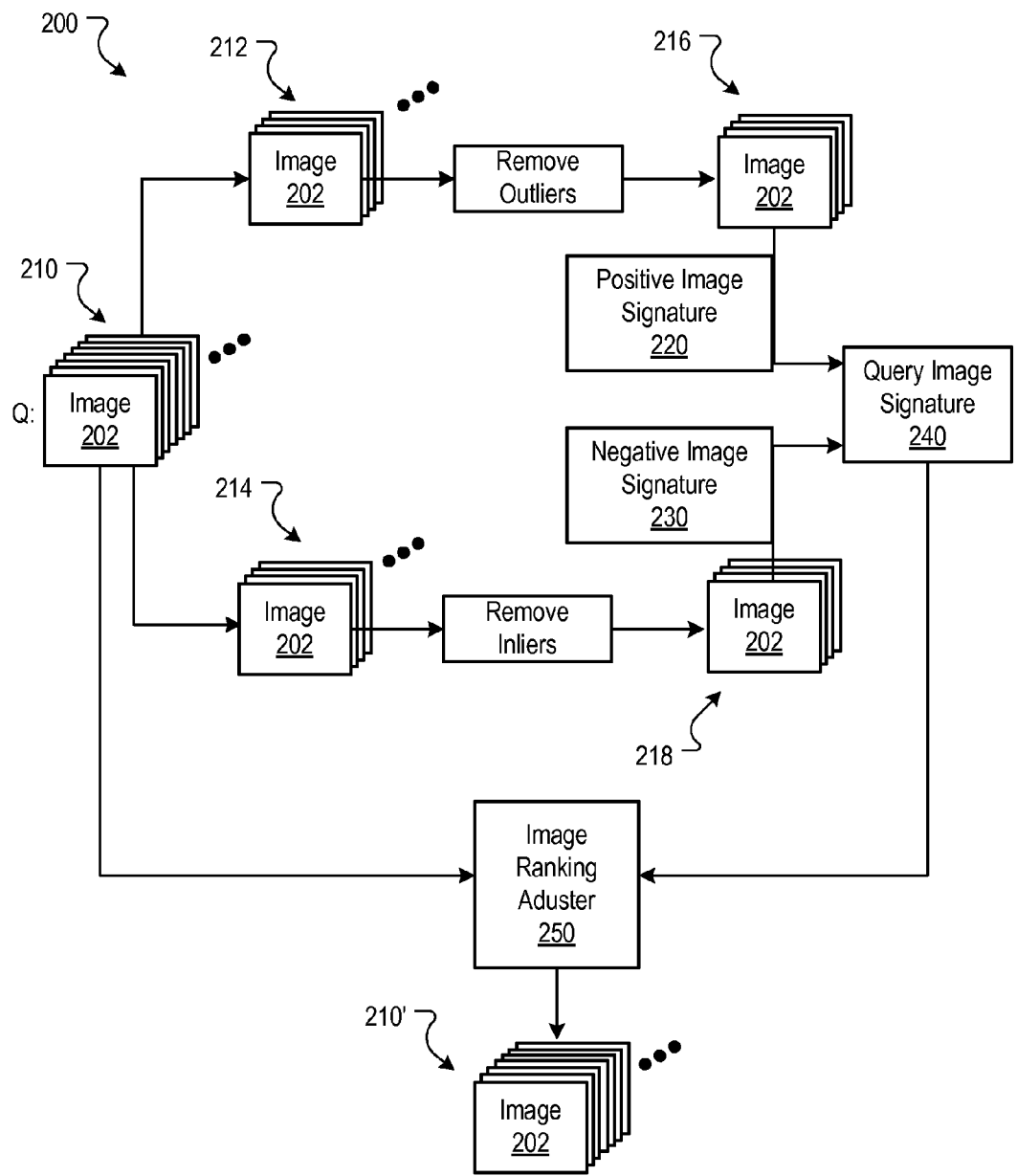
FIG. 2 is a system process flow for generating a query image signature.
Figure 3:
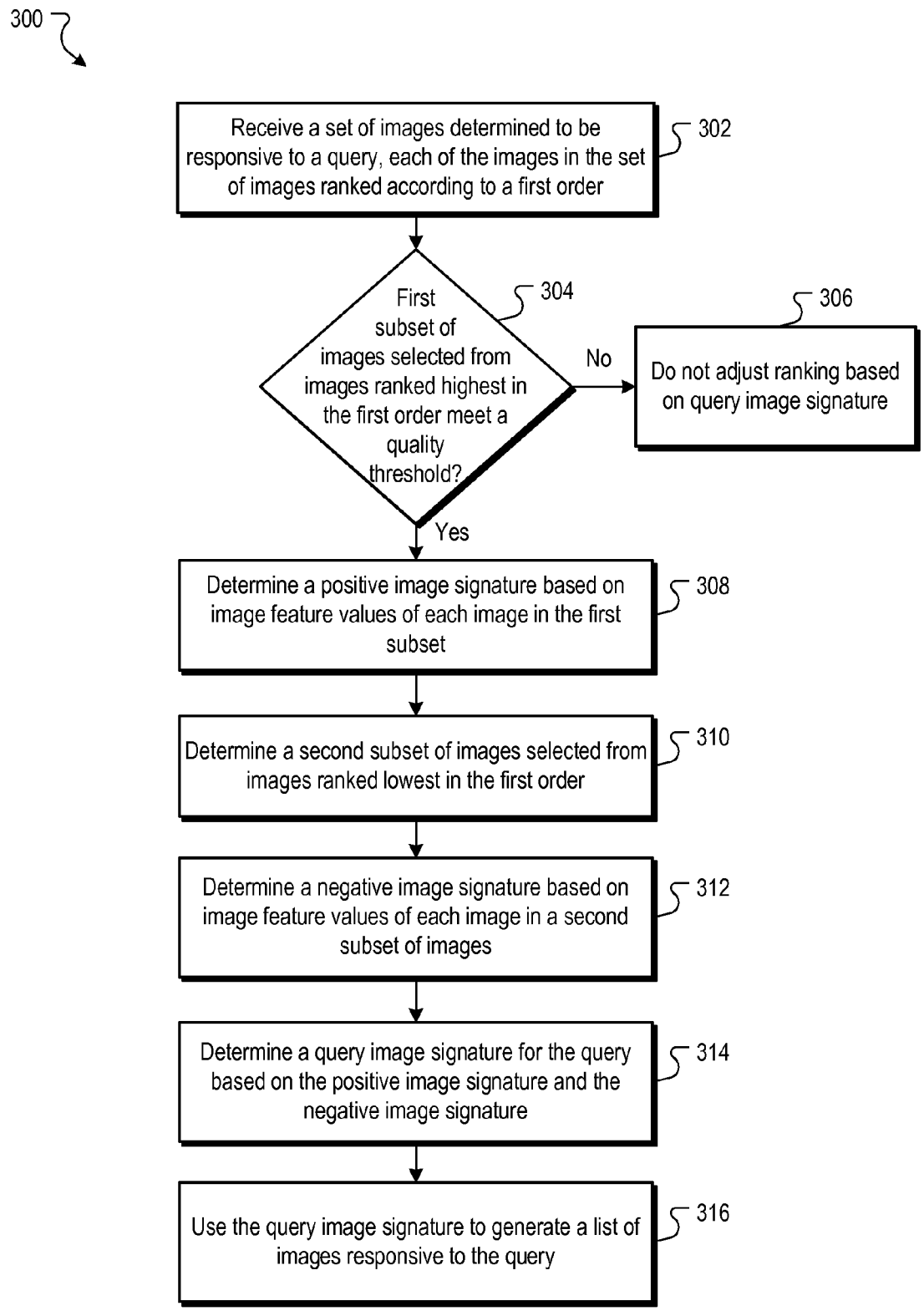
FIG. 3 is a flow diagram of an example process for generating a query image signature.

The process of generating the query image signature is described with reference to FIGS. 2 and 3. FIG. 2 is a system process flow 200 for generating a query image signature, and FIG. 3 is a flow diagram of an example process 300 for generating a query image signature. Operation of the process flow 200 of FIG. 2 is described with reference to the process 300 of FIG. 3. The process 300 of FIG. 3 can be implemented in one or more computers in data communication with each other and programmed to perform the operations described below. For example, the image analysis subsystem 120 can be implemented in computers programmed to perform the operations described below.

The process 300 receives a set 210 of images determined to be responsive to a query, each of the images in the set of images ranked according to a first order (302). For example, for a query of one or more terms, the images that are received are ranked according to a topicality signal in an order from most relevant to least relevant to the query.

The process 300 determines whether a first subset of images selected from images ranked highest in the first order meet a quality threshold (304). For example, the image analysis subsystem 120 may select a subset 212 of the top N images in the first order. The value of N can be a predefined number, e.g., 5, 10, 20, etc. The value of N is, in some implementations, much less than the cardinality of the set of images returned for the query. Alternatively, the number of N images may be determined by the number of images that meet a first relevance threshold, where the first relevance threshold is selected to indicate highly relevant images for a query.

In some implementations, to determine whether the subset 212 meets a quality threshold, the image analysis subsystem 120 selects proper subsets of the subset 212. Then, for each proper subset, the image analysis subsystem 120 determines feature values that describe the features of each of the images in the proper subset, and then builds a model that describes the features of the images. The model may be based on, for example, a central tendency of feature values for each feature, such as an average of feature values for a feature determined from the images. The feature values can also be weighted when building the model such that a feature value of a higher ranked image contributes more to the model than that of a lower ranked image. In some implementations, the feature value of each image can be weighted by the relevance score of the image, such as a product of the feature value and the relevance score. Other weighting schemes can also be used, such as an inverse of the rank of the image so that feature values of the highest ranked image are weighted more heavily than feature values of lower ranked images.

To determine whether the proper subset meets a quality threshold, the image model can be applied to each image in the proper subset to determine how accurately the image model represents the image. For example, in some implementations, for each image, a correlation value that is a measure of correlation between the image model and the feature values of images that belong to the proper subset is determined. If a central tendency of the correlation values meets a correlation threshold, then the proper subset meets the quality threshold. If all of the proper subsets meet the correlation threshold, then the subset from which the proper subsets are generated meets the quality threshold. Removing outliers and evaluating the resulting subsets is an iterative process and is described with reference to FIG. 4 below.

In additional implementations, the process of determining whether a first subset meets a quality threshold can involve building image models from the top-ranked images according to the topicality signal, and from another set of top-ranked images based on another signal, such as a user selection feedback signal. These models are then cross-validated. The cross-validation process can also involve removing outlier images. Cross validating is described with reference to FIG. 5 below.

If a first subset of images selected from images ranked highest in the first order does not meet a quality threshold, then the process 300 does not adjust the ranking of the set of images based on query image signature (306). Such a case may occur, for example, when the query is underserved by the images, or when the query is ambiguous. In such cases, the failure to meet the quality threshold indicates that a reliable model may not result from the images. Accordingly, the ranking of the images will not be adjusted by a query image model.

If, however, a first subset of images selected from images ranked highest in the first order does meet a quality threshold, then the process 300 determines a positive image signature 220 based on image feature values of each image in the first subset (308). In implementations where models are cross-validated, the positive image signature may be based on the image model generated from images ranked according to the user feedback signal if that model validates, otherwise, the model based on the topicality signal is selected, as described with reference to FIG. 5 below.

The process 300 determines a second subset of images 218 selected from images 214 ranked lowest in the first order (310). The second subset of images is selected from images that are ranked lowest in the set of images being evaluated. For example, if Q images were provided for the search query, ranked in order of 1 . . . Q, the second subset may the lowest M images, where M is less than Q. To illustrate, if Q is 1,000, M may be 100, 300, or 500 images. Alternatively, the number of M images may be determined by the number of images that do not meet a second relevance threshold, where the minimum relevance threshold is equal to or less than the first relevance threshold.

The second subset of images may also have inlier images removed. An inlier image is an image in the second subset having feature values that correlate with the positive image signature. The removing of inlier images is described with reference to FIG. 6 below.

The process 300 determines a negative image signature 230 based on image feature values of each image in a second subset of images (312). The negative image signature is generated in a manner similar to the positive image signature. The negative image signature can be generated from a central tendency of the feature values of the remaining images in the second proper subset after the inlier images are removed. In some implementations, the feature values can also be weighted, such as inversely weighted, based on the relevance scores of the corresponding images from which the feature values are determined.

The process 300 determines a query image signature 240 for the query based on the positive image signature 220 and the negative image signature 230 (314). The query image signature 240 can, for example, be a difference of the two signatures, e.g., the positive image signature minus the negative image signature; or can be a weighted combination of the signatures; or some other combination.

The process 300 uses the query image signature to generate a list of images responsive to the query (316). For example, an image ranking adjuster 250 process in the image analysis subsystem 120 can apply the query image signature to each image in the set of images to rank the images according to a second order that is different from the first order. The adjusted ranking results in a modified set of images 210'. In particular, the query image signature is applied to each image to determine a similarity score that is a measure of similarity of the feature values of the image to the query image signature. These similarity scores are then used to adjust the rank of the images; images with very high similarity scores may be boosted in the ranking relative to images with very low similarity scores. The similarity scores can be used, for example, to adjust the relevance scores of each image. A variety of appropriate boosting calculations can be used.

In some implementations, the scores are normalized prior to the adjustment calculations. For example, the median and standard deviations of the scores can be determined, and then each score can be normalized based on a difference between the score and the mean, which is then divided by the standard deviation. Other normalization techniques can also be used.

In other implementations, the query image signature can be used to conduct a new search for the query, and instead of adjusting the ranks of images returned for the query based on the topicality score, a new set of images can be identified based on each image's similarity to the query image signature.

Outlier Removal and Quality Threshold Check

Figure 4:
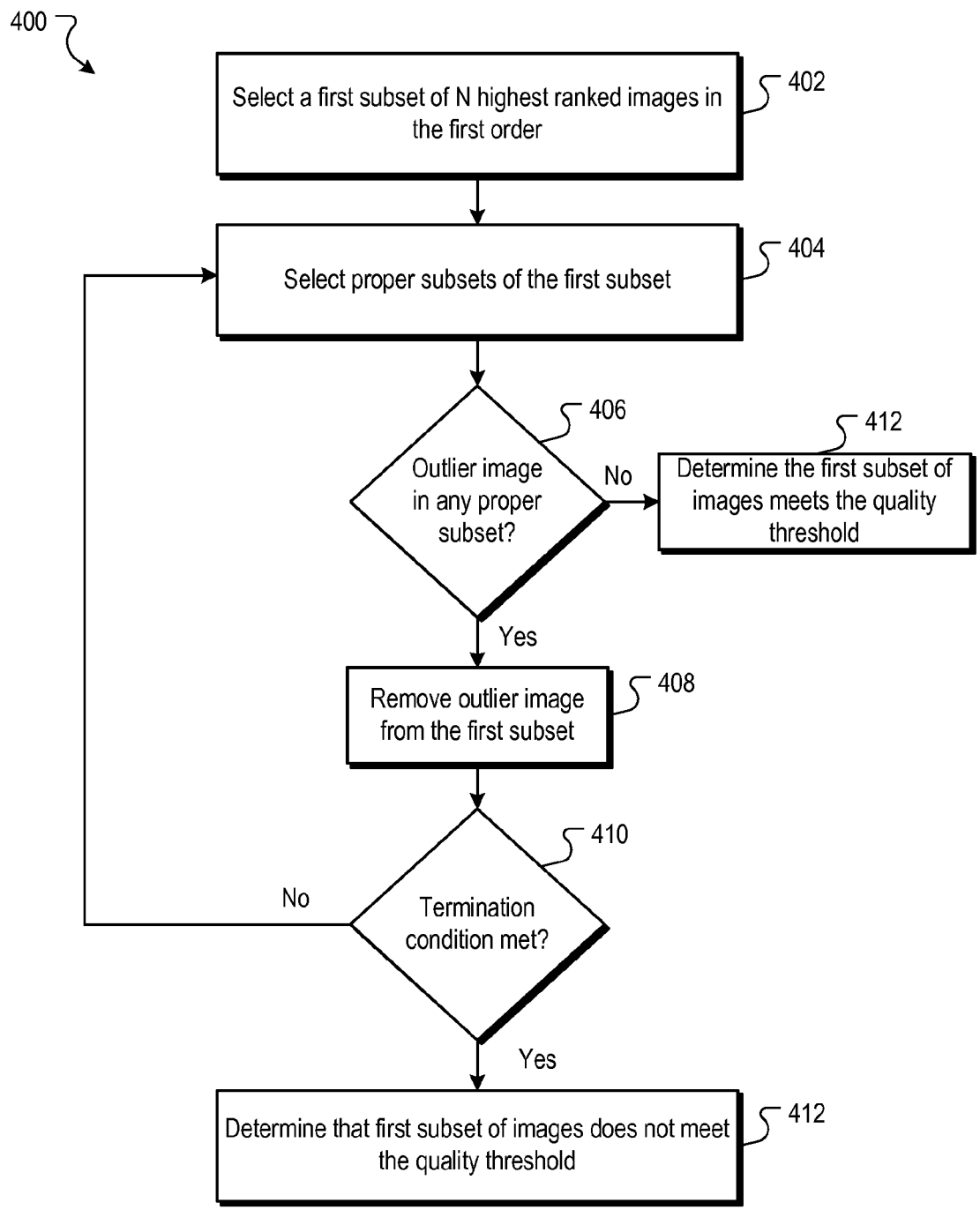
FIG. 4 is a flow diagram of an example process for removing outlier images from a subset of top-ranked images and determining whether the subset meets a quality threshold.

FIG. 4 is a flow diagram of an example process 400 for removing outlier images from a subset of top-ranked images and determining whether the subset meets a quality threshold. The process 400 can be implemented in one or more computers in data communication with each other and programmed to perform the operations described below. The process 400 is one example way of removing outliers, and other appropriate outlier removal processes can also be used.

The process 400 selects a set of N highest ranked images in the first order (402). As described above, the value of N may be fixed or may vary, depending on the implementation used.

The process 400 selects proper subsets of the N image (404). For example, the image analysis subsystem 120 may select N−1 images for each proper subset. Each proper subset is different from each other proper subset, but includes the image that is ranked first in the first order. For example, if N=5, the proper subsets are {1, 2, 3, 4}, {1, 2, 3, 5}, {1, 2, 4, 5}, and {1, 3, 4, 5}, where each number corresponds to an image at a particular ordinal position in the proper subset.

The process 400 determines whether outliers are in any of the proper subsets (406). To determine whether an outlier exists, the image analysis subsystem 120 generates an image model for each proper subset. The image model for each proper subset may be generated as described above. Then, for each model, a similarity score, such as a correlation score, is determined for each image from the set from which the model was generated. These similarity scores are used to determine if any of the proper subsets fail to meet a quality threshold. For example, the scores for each set can be average, e.g., for the four sets above, the average scores may be 0.82, 0.77, 0.91 and 0.69, respectively. If any of the scores fail to meet a quality threshold, then the set of images is determined to have an outlier. For example, assume the threshold is 0.7. Because the score 0.69 does not meet this threshold, the set of N images includes an outlier. The image set for which the highest score is determined is then selected, and the image that is not included in this set is excluded, resulting in removal of the outlier image from the first subset (408). This effectively decreases the cardinality N of the first subset. In this example, the image set {1, 2, 4, 5} is selected, as it had the highest score of 0.91. This results in image {3} being discarded as an outlier.

The process 400 determines if a termination condition is met (410). One example termination condition is N decreasing to a minimum cardinality. The minimum cardinality can be, for example, 1, or some value that is greater than one and less than N. Other termination conditions can also be used.

If the process 400 determines a termination condition is met, then the process 400 determines that the first subset does not meet the quality threshold (414). If, however, the process determines a termination condition is not met, then the process 400 returns to step 404. The process 400 the repeats the steps described above.

Returning to step 406, assume that on a second iteration the process 400 determines that none of the proper subsets have outliers. For example, with the selected image set of {1, 2, 4, 5}, the proper subsets are {1, 2, 4}, {1, 4, 5}, and {1, 2, 5}. Assume the average scores for each set, based on a respective image model generated for each set, are 0.84, 0.79, and 0.91, respectively. The process 400 then determines the first subset of the images meets the quality threshold (412). A positive image signature is then built from the images in the first subset, e.g., from images {1, 2, 4, 5}. The positive image signature, in some implementations, is built in the same manner that the image model is built for each proper subset.

In an alternate implementation, the process 400 will select the proper subset with the highest average score, which, in this example, is {1, 2, 5}. A positive image signature is then built from the selected proper subset. In variations of this implementation, the positive image signature is the same as the image model that was used to evaluate the images in the set. However, in other implementations, a different model type can be used.

Cross Validation

In another implementation, two positive image signatures are separately built from different sets of images. The process used to build each respective positive image signature can be as described with reference to FIG. 4 above, but the images that are selected to build the model are different. In particular, the images for a first model are selected according to a topical ranking signal, and the images for a second model are selected based on a user selection feedback signal. The cross validation process can be used when there is enough user feedback data available for a query to sufficiently generate a ranking different from the ranking of the images returned in response to the topical signal, but not enough user feedback data to train and build a more robust user feedback based ranking model. Such data may be available for non-unique queries that are still classified as long-tail queries, e.g., a query for an image search that has been received ten or more times, instead of just once.

To illustrate on a reduced scale, assume a set of 20 images are returned for a query, ranked according to a topicality signal in a first order from 1 to 20, e.g., {1, 2 . . . 20}. Also assume at least a proper subset of the images, e.g., 15, have user feedback signal data available. Ranking the 15 images according to the user feedback data results in the following ranking in a second order relative to the first order:

{4, 1, 3, 5, 6, 8, 13, 7, 9, 2, 10, 15, 12, 11, 14}

The top N (where N=5) ranked images in the first order are {1, 2, 3, 4, 5}, and the top N images in the second order are {4, 1, 3, 5, 6}. These two image sets are used to generate the respective positive models, and the positive models are then cross validated to select one of them as the positive image signature.

Figure 5:
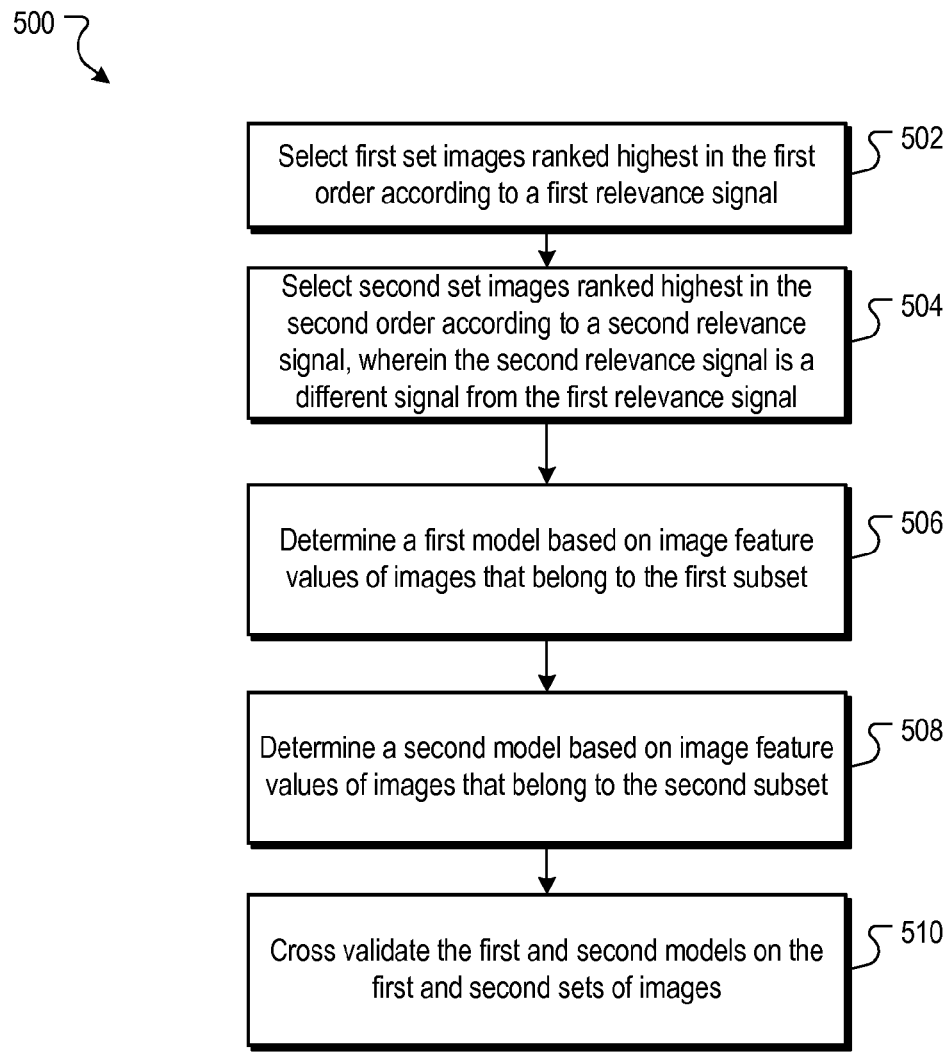
FIG. 5 is a flow diagram of an example process for cross-validating image models.

FIG. 5 is a flow diagram of an example process 500 for cross-validating image models. The process 500 can be implemented in one or more computers in data communication with each other and programmed to perform the operations described below.

The process 500 selects a first set images ranked highest in the first order according to a first relevance signal (502). For example, as described above, for a query Q, the set {1, 2 . . . 20} is received, a first set of images {1, 2, 3, 4 5} is selected, and proper subsets from the set {1, 2, 3, 4, 5} are selected and evaluated for outliers.

The process 500 selects a second set images ranked highest in the second order according to a second relevance signal, wherein the second relevance signal is a different signal from the first relevance signal (504). For example, as described above, the second relevance signal can be a user feedback signal, a second set of {4, 1, 3, 5, 6} is selected, and proper subsets from the image set of {4, 1, 3, 5, 6} are selected.

The process 500 determines a first model based on image feature values of images that belong to the first subset (506), and a second model based on image feature values of images that belong to the second subset (508). Again, each model can be generated as described above.

The process 500 cross validates the first and second models on the first and second subsets of images (510). In some implementations, cross validation involves determining for each model a similarity score, such as a correlation score, for each image from the set from which the other model was generated. To illustrate, assume model M1 is generated from a subset of the images selected according to the topical ranking, e.g., from images {1, 2, 5}, and that model M2 is generated from a subset of images selected according to the user feedback ranking, e.g., from images {4, 1, 5, 6}. Model M1 is applied to images {4, 1, 3, 5, 6} and model M2 is applied to images {1, 2, 3, 4, 5} and an average score is produced for each set. A model validates if the average score meets a quality threshold. Furthermore, in some implementations, preference is given to the user feedback model so that it is selected over the topicality based model. Thus, in some implementations, the second model M2 is selected as the positive image signature if the second model validates on the first candidate proper subset of images. However, if the second model does not validate, but the first model M1 does validate on the second candidate proper subset of images, then the first model M1 is selected. Otherwise, no model is selected and a query image signature is not built.

In alternate implementations, the first model will be selected as a fall back, regardless of whether it validates on the second subset of images, if the second model does not validate.

In some implementations, the bottom set of images for generating the negative image signature is selected from images ranked according to the first order, regardless of which model is selected. In other implementations, the bottom set of images for generating the negative image signature is selected from images ranked according to the second order if the second model is selected, and selected from images ranked according to the first order if the first model is selected.

Inlier Removal

Figure 6:
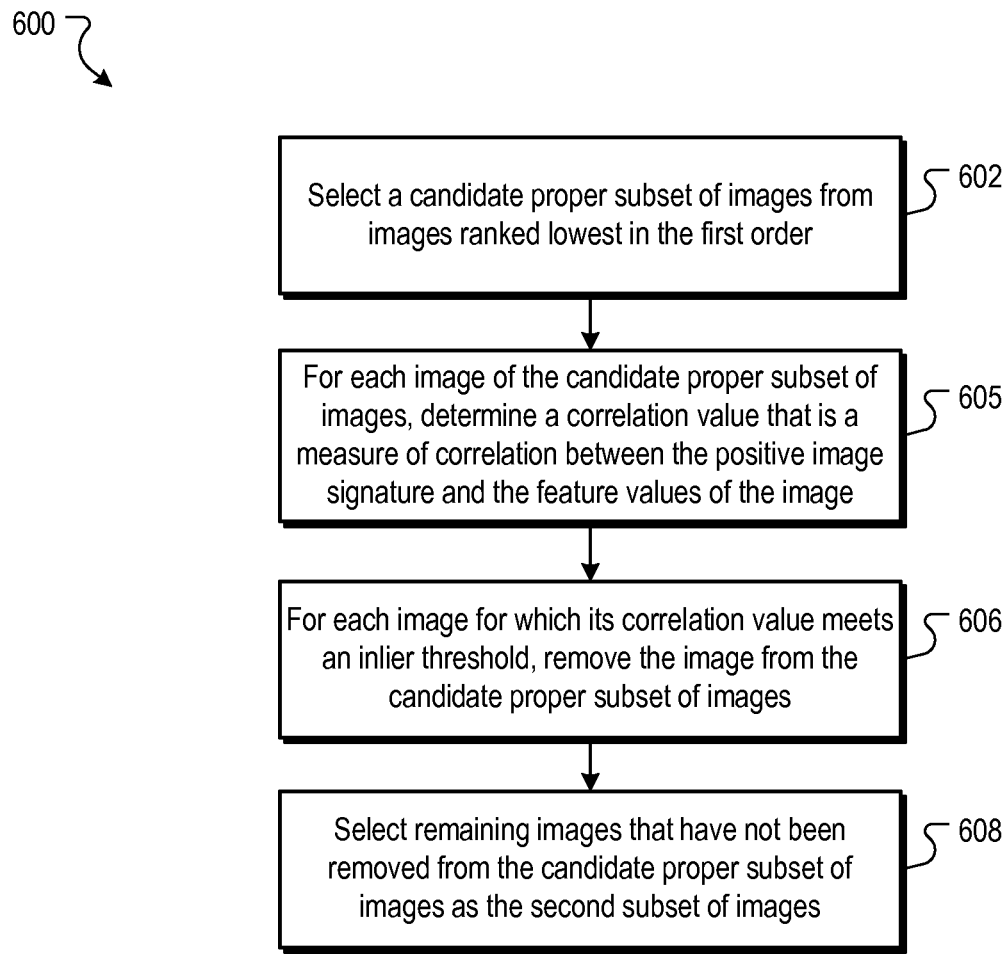
FIG. 6 is a flow diagram of an example process for removing inlier images from a subset of bottom-ranked images.

FIG. 6 is a flow diagram of an example process 600 for removing inlier images from a proper subset of bottom-ranked images. The process 600 can be implemented in one or more computers in data communication with each other and programmed to perform the operations described below.

The process 600 selects a candidate proper subset of images from images ranked lowest in the first order (602). For example, if Q images were provided for the search query, ranked in order of 1 ... Q, the second proper subset may be the lowest M images, where M is less than Q. The number of M images may be determined by the number of images that do not meet a second relevance threshold, or may be a fixed number.

The process 600, for each image is the candidate proper subset of images, determines a correlation value that is a measure of correlation between the positive image signature and the feature values of the image (604). For example, for each image, the positive image signature is applied to the feature values of the image, and a correlation value is determined. Generally, the greater the similarity of feature values of the image to the feature values of the positive image signature, the higher the correlation value will be.

The process 600, for each image for which its correlation value meets an inlier threshold, removes the image from the candidate proper subset of images (606). The inlier threshold is a reference value that is compared to a correlation value for an image. If the correlation value meets or exceeds the inlier threshold, the image is removed from the candidate proper subset.

The process 600 selects remaining images that have not been removed from the candidate proper subset of images as the second proper subset of images (608). All remaining images that are not inliers are used to generate the negative image signature. The negative image signature is generated in a manner similar to the positive image signature. The negative image signature can be generated from a central tendency of the feature values of the remaining images in the second proper subset after the inlier images are removed. In some implementations, the feature values can also be weighted, such as inversely weighted, based on the relevance scores of the corresponding images from which the feature values are determined.

Additional Features and Variations

The processes above are described with reference to "long tail" queries to augment an image search capability when sufficient modeling data are not available to generate a model for the query. However, the processes described above can also be used for any query, regardless of its long tail status. For example, a search system may not train and build persistent models for queries, and may instead use the processes described above for every query at query time.

In the cross-validation example described above, two models are built based on rankings according to two different relevance signals. However, more than two different signals can be used to generate multiple different rankings, and a positive model for each ranking can be generated and validated. A priority scheme can be used to select models that validate according to the predefined preference. For example, a first relevance signal may be the topical relevance signal, a second relevance signal may be a user feedback signal, a third relevance signal may be an authority based signal that measures an authority of an image relative to other images, etc. Models for rankings based on each signal, or combination of signals, can be generated and validated, and a validated model is selected according to the priority scheme.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, e.g., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media, e.g., multiple CDs, disks, or other storage devices.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program, also known as a program, software, software application, script, or code, can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network, e.g., the Internet, and peer-to-peer networks, e.g., ad hoc peer-to-peer networks.

The computing system can include clients and servers. A client and server are generally remote from each other and typically interact through a communication network. The relationship of client and server arises by virtue of computer programs running on the respective computers and having a client-server relationship to each other. In some implementations, a server transmits data, e.g., an HTML page, to a client device, e.g., for purposes of displaying data to and receiving user input from a user interacting with the client device. Data generated at the client device, e.g., a result of the user interaction, can be received from the client device at the server.

While this specification contains many specific implementation details, these should not be construed as limitations on the scope of this document or of what may be claimed, but rather as descriptions of features specific to particular implementations of the subject matter. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by a data processing apparatus, the method comprising:
  receiving queries, and for each query:
    receiving a set of images determined to be responsive to the query, each of the images in the set of images ranked according to a first order;
    determining whether a first subset of images selected from images ranked highest in the first order meets a quality threshold; for each query for which the first subset of the images does not meet the quality threshold, not adjusting, based on a query image signature, a ranking of the images according to the first order;
  for each query for which the first subset of the images meet the quality threshold:
    determining a positive image signature based on image feature values of the images in the first subset;
    determining a second subset of images selected from images ranked lowest in the first order;
    determining a negative image signature based on image feature values of each image in a second subset of images;
    determining the query image signature for the query based on a difference of the positive image signature and the negative image signature; and
    applying the query image signature to each image in the set of images to rank the images according to a second order that is different from the first order.

2. The computer-implemented method of claim 1, wherein determining whether a first subset meets the quality threshold comprises:
   iteratively evaluating the first subset of images, the first subset having an initial cardinality of N images, to determine whether the first subset of images meets the quality threshold, wherein each iteration comprises:
      selecting proper subsets of N−1 images, wherein each proper subset is different from each other proper subset and includes an image that is ranked first in the first order;
      determining whether any of the proper subsets include an outlier image;
      if any of the proper subsets include an outlier image, then determining if a termination condition is met;
         if the termination condition is met, then determining that the first subset of images selected from images ranked highest in the first order does not meet the quality threshold;
         if the termination condition is not met, then:
            removing the outlier image from the first subset of images; and
            performing another iteration;
      if none of the proper subsets include an outlier image, then determining the first subset of images meets the quality threshold.

3. The computer implemented method of claim 2, wherein determining if the termination condition is met comprises determining that the termination condition is met when the cardinality N of the first subset is decreased to a minimum cardinality.

4. The computer-implemented method of claim 3, wherein:
   determining whether any of the proper subsets include an outlier image comprises:
      for each proper subset:
         determining an image model based on image feature values of images that belong to the proper subset;
         determining a correlation value that is a measure of correlation between the image model and the feature values of images that belong to the proper subset;
      determining that the proper subsets include an outlier image when one or more of the correlation values does not meet a correlation threshold.

5. The computer implemented method of claim 4, wherein determining the positive image signature based on image feature values of the images in the first subset comprises generating an image model based on the image feature values of each image in each of the first subset.

6. The computer-implemented method of claim 4, wherein determining the image model based on image feature values of images that belong to the proper subset comprises:
   determining, from each feature value of a feature type, a weighted central tendency feature value of the feature type based on the respective feature values of the image that belong to the proper subset and respective relevance scores of the images that belong to the proper subset, wherein first order is determined, in part, on the relevance scores.

7. The computer-implemented method of claim 1, wherein determining whether a first subset of images selected from images ranked highest in the first order meets a quality threshold comprises:
   selecting a first set of images ranked highest in the first order according to a first relevance signal;
   selecting a second set images ranked highest in the first order according to a second relevance signal, wherein the second relevance signal is a different signal from the first relevance signal;
   determining a first model based on image feature values of images that belong to the first set;
   determining a second model based on image feature values of images that belong to the second set; and
   validating the first and second models on the second set of images and the first set of images, respectively.

8. The computer implemented method of claim 7, determining the positive image signature based on image feature values of each image in the first set comprises:
   selecting the second model as the positive image signature if the second model validates on the first set of images; and
   selecting the first model as the positive image signature if the second model does not validate on the first set of images and the first model does validate on the second set of images.

9. The computer implemented method of claim 8, wherein the first relevance signal is a topical relevance signal, and the second relevance signal is a user selection feedback signal.

10. The method of claim 1, wherein determining the second subset of images selected from images ranked lowest in the first order comprises:
   selecting a candidate proper subset of images from images ranked lowest in the first order;
   for each image is the candidate proper subset of images, determining a correlation value that is a measure of correlation between the positive image signature and the feature values of the image;
   for each image for which its correlation value meets an inlier threshold, removing the image from the candidate proper subset of images; and
   selecting remaining images that have not been removed from the candidate proper subset of images as the second subset of images.

11. The method of claim 1, wherein applying the query image signature to each image in the set of images to rank the images according to a second order that is different from the first order comprises:
   for each image, determining a similarity score that is a measure of similarity of the feature values of the image to the query image signature; and
   adjusting the rank of the images based on the similarity scores determined for the images.

12. The method of claim 11, wherein adjusting the rank of the images based on the similarity scores determined for the images comprises:
   normalizing the similarity scores for the images to generate, for each image, a normalized similarity score; and
   adjusting, for each image, a relevance score of the image by the normalized similarity score, wherein the relevance scores of the images are scores determinative of the first order.

13. A computer-implemented method performed by a data processing apparatus, the method comprising:
   receiving a query;
   receiving a set of images determined to be responsive to the query, each of the images in the set of images ranked according to a first order;
   selecting a first subset of images selected from images ranked highest in the first order;
   removing outlier images from the first subset of images;

determining a positive image signature based on image feature values of the images remaining in the first subset of images;

determining a second subset of images selected from images ranked lowest in the first order;

removing inlier images from the second subset of images, each inlier image being an image for which a correlation between the positive image signature and the feature values of the image meets an inlier threshold;

determining a negative image signature based on image feature values of the images remaining in the second subset of images;

determining a query image signature for the query based on a difference of the positive image signature and the negative image signature; and applying the query image signature to each image in the set of images to rank the images according to a second order that is different from the first order.

14. The computer-implemented method of claim 13, wherein removing outliers from the first subset of images comprises:

iteratively evaluating the first subset of images, the first subset having an initial cardinality of N images, wherein each iteration comprises:

selecting proper subsets of N−1 images, wherein each proper subset is different from each other proper subset and includes an image that is ranked first in the first order;

determining whether any of the proper subsets include an outlier image;

if any of the proper subsets include an outlier image, then removing the outlier image from the first subset of images; and performing another iteration;

if none of the proper subsets include an outlier image, then determining that the outlier images are removed from the first subset.

15. The computer-implemented method of claim 14, wherein removing inliers from the second proper subset comprises:

for each image is the second subset of images, determining a correlation value that is a measure of correlation between the positive image signature and the feature values of the image;

for each image for which its correlation value meets an inlier threshold, removing the image from the second subset of images.

16. A non-transitory computer storage medium encoded with a instructions executable by a data processing apparatus and that upon such execution cause the data processing apparatus to perform operations comprising:

receiving queries, and for each query:

receiving a set of images determined to be responsive to the query, each of the images in the set of images ranked according to a first order;

determining whether a first subset of images selected from images ranked highest in the first order meets a quality threshold; for each query for which the first subset of the images does not meet the quality threshold, not adjusting, based on a query image signature, a ranking of the images according to the first order;

for each query for which the first subset of the images meet the quality threshold:

determining a positive image signature based on image feature values of the images in the first subset;

determining a second subset of images selected from images ranked lowest in the first order;

determining a negative image signature based on image feature values of each image in a second subset of images;

determining the query image signature for the query based on a difference of the positive image signature and the negative image signature; and applying the query image signature to each image in the set of images to rank the images according to a second order that is different from the first order.

17. A non-transitory computer storage medium encoded with a instructions executable by a data processing apparatus and that upon such execution cause the data processing apparatus to perform operations comprising:

receiving a query;

receiving a set of images determined to be responsive to the query, each of the images in the set of images ranked according to a first order;

selecting a first subset of images selected from images ranked highest in the first order;

removing outlier images from the first subset of images;

determining a positive image signature based on image feature values of the images remaining in the first subset of images;

determining a second subset of images selected from images ranked lowest in the first order;

removing inlier images from the second subset of images, each inlier image being an image for which a correlation between the positive image signature and the feature values of the image meets an inlier threshold;

determining a negative image signature based on image feature values of the images remaining in the second subset of images;

determining a query image signature for the query based on a difference of the positive image signature and the negative image signature; and applying the query image signature to each image in the set of images to rank the images according to a second order that is different from the first order.

18. A system comprising:

a data processing apparatus; and a data store storing instructions executable by the data processing apparatus and that upon such execution cause the data processing apparatus to perform operations comprising:

receiving queries, and for each query:

receiving a set of images determined to be responsive to the query, each of the images in the set of images ranked according to a first order;

determining whether a first subset of images selected from images ranked highest in the first order meets a quality threshold; for each query for which the first subset of the images does not meet the quality threshold, not adjusting, based on a query image signature, a ranking of the images according to the first order;

for each query for which the first subset of the images meet the quality threshold:

determining a positive image signature based on image feature values of the images in the first subset;

determining a second subset of images selected from images ranked lowest in the first order;

determining a negative image signature based on image feature values of each image in a second subset of images;

determining the query image signature for the query based on a difference of the positive image signature and the negative image signature; and applying the query image signature to each image in the set of images to rank the images according to a second order that is different from the first order.

19. A system comprising:

a data processing apparatus; and a data store storing instructions executable by the data processing apparatus and that upon such execution cause the data processing apparatus to perform operations comprising:

receiving a query;

receiving a set of images determined to be responsive to the query, each of the images in the set of images ranked according to a first order;

selecting a first subset of images selected from images ranked highest in the first order;

removing outlier images from the first subset of images;

determining a positive image signature based on image feature values of the images remaining in the first subset of images;

determining a second subset of images selected from images ranked lowest in the first order;

removing inlier images from the second subset of images, each inlier image being an image for which a correlation between the positive image signature and the feature values of the image meets an inlier threshold;

determining a negative image signature based on image feature values of the images remaining in the second subset of images;

determining a query image signature for the query based on a difference of the positive image signature and the negative image signature; and applying the query image signature to each image in the set of images to rank the images according to a second order that is different from the first order.

* * * * *